United States Patent [19]

Loomis, III

[11] Patent Number: 4,501,399

[45] Date of Patent: Feb. 26, 1985

[54] HYBRID MONOPULSE/SEQUENTIAL LOBING BEAMRIDER GUIDANCE

[75] Inventor: Jester M. Loomis, III, Huntsville, Ala.

[73] Assignee: The United States of America as represented by the Secretary of the Army, Washington, D.C.

[21] Appl. No.: 284,895

[22] Filed: Jul. 20, 1981

[51] Int. Cl.[3] .......................... F41G 7/24; G01S 13/66

[52] U.S. Cl. ................................ 244/3.13; 343/7 ED; 343/16 M

[58] Field of Search ................ 343/16 M, 117 R, 7 A, 343/7.4, 16 LS, 17.2 R, 7.6, 422, 423, 424, 427, 343 7 ED; 244/3.14, 3.13, 3.15, 3.19

[56] References Cited

U.S. PATENT DOCUMENTS

| | | | |
|---|---|---|---|
| 2,421,663 | 6/1947 | Tolson | 244/3.19 |
| 3,274,592 | 9/1966 | Grane | 343/11 R |
| 3,351,941 | 11/1967 | Page | 244/3.13 |
| 3,623,094 | 11/1971 | Grabowski et al. | 343/16 M |
| 4,030,686 | 6/1977 | Buchman | 244/313 |
| 4,136,343 | 1/1979 | Heffner et al. | 343/16 M |
| 4,319,242 | 3/1982 | Lewis | 343/16 M |

OTHER PUBLICATIONS

Merrill I. Skolnik, *Introduction to Radar Systems*, McGraw-Hill Book Co., 1962, pp. 165-166.

*Primary Examiner*—Maynard R. Wilbur
*Assistant Examiner*—K. R. Kaiser
*Attorney, Agent, or Firm*—Anthony T. Lane; Robert P. Gibson; Robert C. Sims

[57] ABSTRACT

The method uses a combination monopulse and sequential lobing system to guide a vehicle, such as a missile, aircraft, auto, etc., toward a target. The target is tracked with conventional monopulse techniques while at the same time the vehicle is provided with coded data forming a cluster so as to provide spatial resolution information. The vehicle sequentially receives this information, stores the information until the sequence is complete and processes the information for guidance.

1 Claim, 10 Drawing Figures

HYBRID MONOPULSE/SEQUENTIAL LOBING BEAMRIDER GUIDANCE

DEDICATORY CLAUSE

The invention described herein may be manufactured, used, and licensed by or for the Government for governmental purposes without the payment to me of any royalties thereon.

DESCRIPTION OF THE BEST MODE AND PREFERRED EMBODIMENT

Beamrider guidance has been used to direct missiles to their target in several military systems. Basically, a beamrider guidance system uses a beam directed in space such that the center of the beam axis forms a line along which it is desired to guide a missile. The beam which may be either at radar or light frequencies contains a code such that a missile with an appropriate receiver can determine its relative position within the beam. Aerodynamic surfaces coupled to the receiver through servo-mechanisms drive the missile to the center of the beam if it has deviated from the beam axis.

Figure 1A:
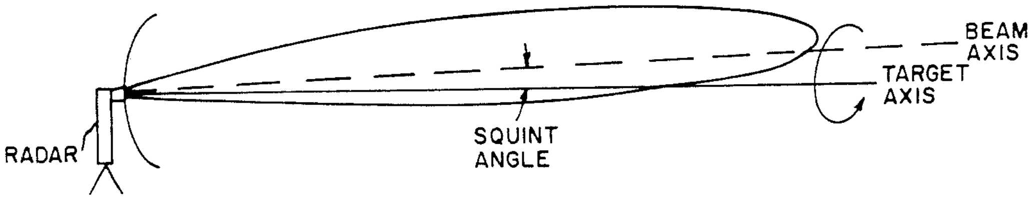
FIG. 1A (PRIOR ART)
FIG. 1A is a schematic drawing of a radar system in which the beam rotates continuously about the target axis.
Figure 1C:
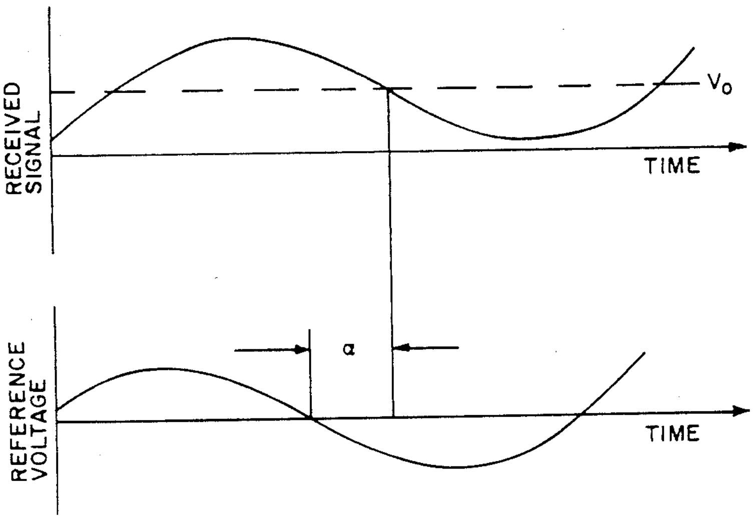
FIG. 1C (PRIOR ART)
FIG. 1C is a diagram showing received signals from a system such as that shown in FIG. 1A.
Figure 1B:
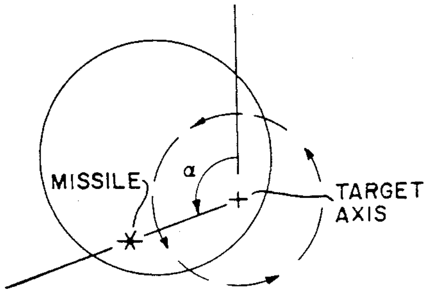
FIG. 1B (PRIOR ART)
FIG. 1B is a depiction of a missile flying off-axis with a beam rotating about the target axis.

Thus far systems that employ beamrider guidance rely on conical scanning of the radar beam to both track the target and provide guidance data to the missile. Conical scan radar systems are well documented in the radar literature and its use as a guidance technique is similar in principle. As illustrated in FIG. 1A, the radar beam axis is squinted slightly from the target axis, and is rotated in a continuous circular fashion about the target axis. As shown in FIG. 1B, the amount of received signal will vary as the beam completes its rotation. This signal will vary sinusoidally as depicted in FIG. 1C. A reference signal is generated on board the missile based on a previously transmitted synchronization signal. The magnitude of the distance that the missile is off-axis is proportional to the peak-to-peak signal fluctuation, while the direction of the error is determined from the phase difference between the sync signal and the received signal.

Figure 2:
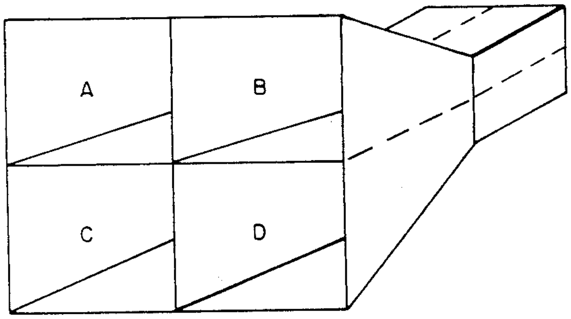
FIG. 2 is a diagrammatic showing of a four-horn feed antenna.
Figure 3:
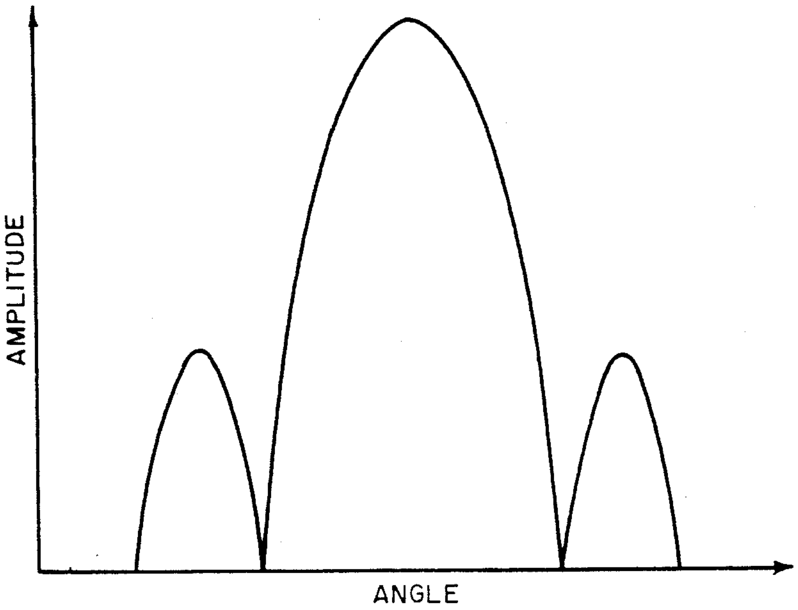
FIG. 3 is an illustration of a illuminating beam from a monopulse tracking radar.
Figure 4:
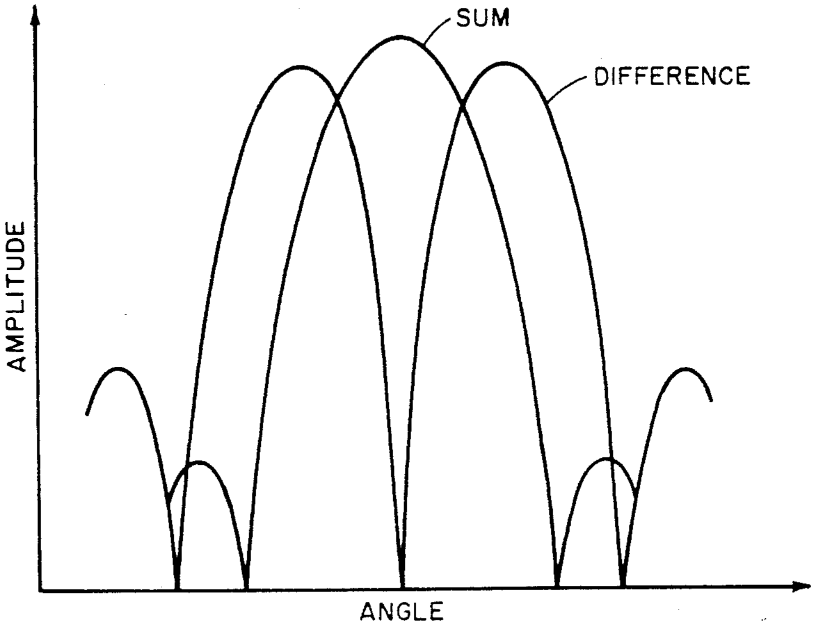
FIG. 4 is an illustration of received beams in a monopulse system.

Monopulse, although more complex than conical scan, offers advantages in tracking accuracy, data rate system efficiency, and electronic countermeasures. Consider FIG. 2 which depicts a four-horn monopulse feed. This feed might be used alone or could be used with a reflector or lens to increase resolution and gain. In a monopulse tracking system all four horns would be excited in-phase to produce an illumination beam as illustrated in FIG. 3. When receiving, the output of the horns are taken all in-phase to form the sum beam; an elevation difference beam is formed by taking A and B in-phase and anti-phased with C and D; and an azimuth difference beam is formed by taking A and C in-phase and anti-phased with B and D. These receive beams, shown in FIG. 4, are all available simultaneously and are generally processed in three parallel channels. The position of the target is determined within the radar receiver by processing the amplitude and phase of the target return from each of the three beams.

In addition to conical scan and monopulse, a further radar tracking technique, sequential lobing, exists. Sequential lobing was the first tracking technique to be employed in a radar. Angle tracking is performed by comparing the return signal from four offset beams in the two orthogonal planes. This is a relatively complex and inefficient tracking method and gradually evolved into a continuous rotation of the beam around the target axis, conical scan.

The present invention provides for a method to use a combination monopulse and sequential lobing system in a beamrider missile system. The target is tracked with a conventional monopulse receiver while guidance data is furnished to the missile via sequential lobing. Recall that in a monopulse system, target illumination is achieved by creating a single beam as represented in FIG. 3. This single beam does not have any spatial characteristics that would allow a missile to discern its position within the beam. Consequently, some method of adding a spatial characteristic to the illumination beam is necessary before guidance can be enacted.

Figure 5:
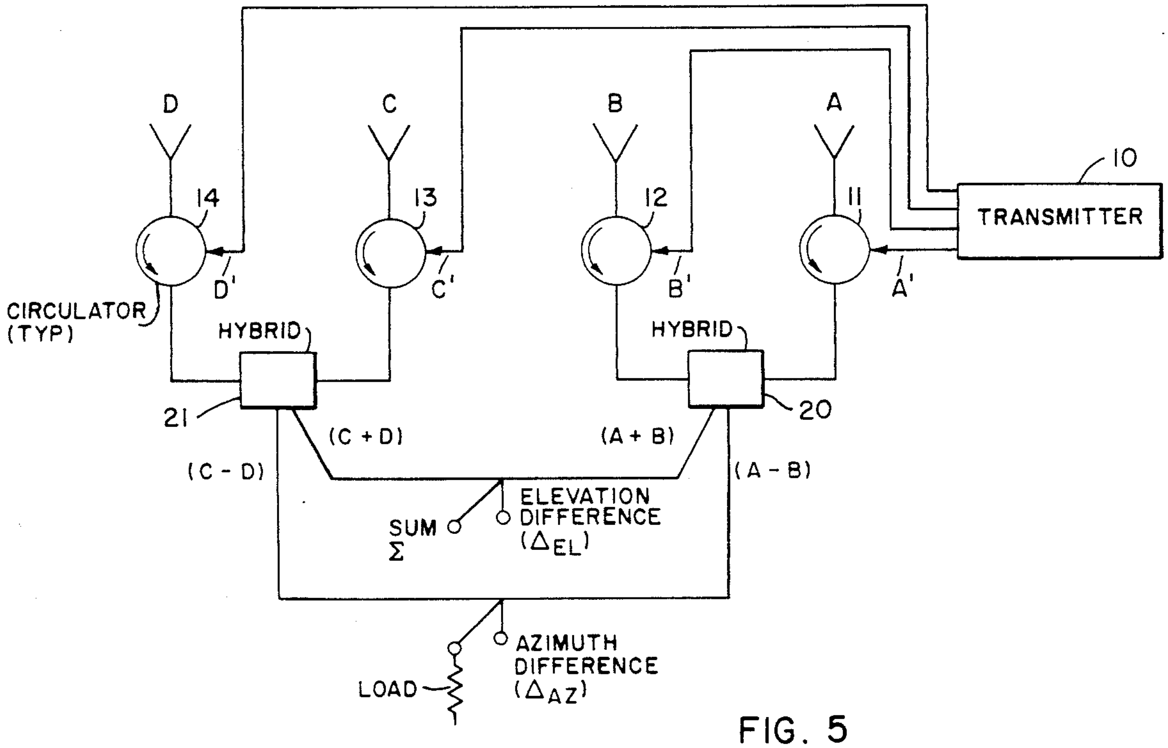
FIG. 5 is a schematic diagram of a basic illustration of the present invention.
Figure 6:
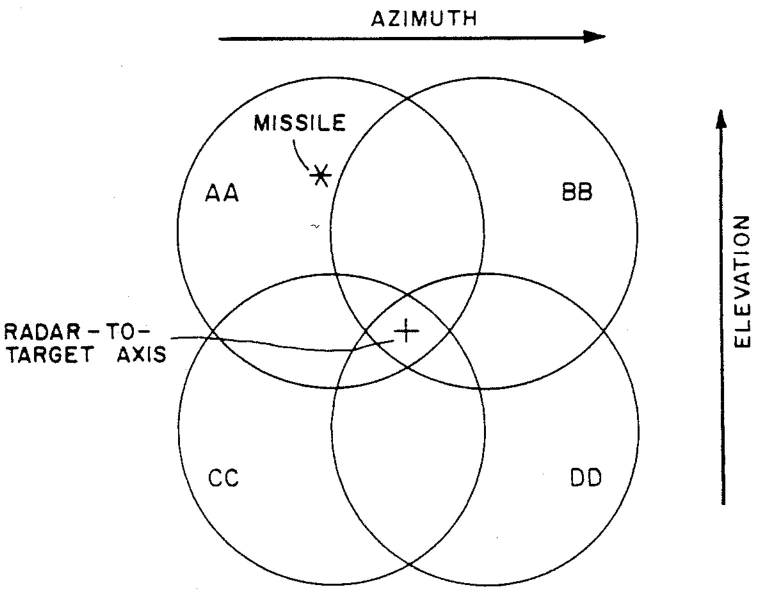
FIG. 6 is an illustration of the four beam illumination cluster formed by the present invention.

Rather than transmitting through all of the horns simultaneously, guidance information can be provided to a missile by transmitting through each horn individually. Possible configurations are taught in Loomis, J. M., "Reflector Antenna for Beamrider Applications," U.S. Army Research and Development Command, ITN-T-78-5, Dec. 22, 1977. Each of these signals can be coded in a manner so that the missile with a prior knowledge of the code could locate its position within the illumination raster. The feed shown in FIG. 5 is capable of being used in this dual missile guidance and target tracking role. First, horn A is excited with code $A^1$, by transmitter 10 thereby illuminating a position AA in space as depicted in FIG. 6. The circulators 11–14 are switched to receive the scattered energy from the target, and the radar develops error signals in the customary fashion by using hybrids 20 and 21 and outputs from the $\Sigma$, $\Delta_{az}$, $\Delta_{el}$ ports. The illumination energy AA is slightly offset from receive sum beam thereby adding about 1 to 2 dB of loss with respect to a conventional monopulse radar. The missile, meanwhile, receives the code $A^1$ illumination and determines the magnitude of the incoming signal, $E_a$. The next transmit signal with a different code $B^1$ is sent by transmitter 10 through only horn B which is offset slightly in azimuth. Target tracking is performed within the monopulse receiver just as in the case of illumination through horn A. The missile also receives this new code and determines its magnitude $E_b$. Similarily, signals from horns C and D are transmitted and processed by the missile into $E_c$ and $E_d$. Subsequent processing on board the missile then determines its position within these four beams. This missile processing is very similar to the error signal generation by a sequential lobing tracking radar. For example, in FIG. 6, the missile is assumed to lie at point *. In this situation $E_a<E_b<E_c<E_d$. The elevation position, within the beams is determined by $$\epsilon = K_e \frac{(E_a + E_b) - (E_c + E_d)}{E_a + E_b + E_c + E_d} \quad (1)$$

where $K_e$ is the elevation slope factor, with units typically milliradians/volt, dependent only on the radar transmitting beams and stored on-board the missile.

The azimuth position, is similarily determined to be $$\alpha = K_a \frac{(E_a + E_c) - (E_b + E_d)}{E_a + E_b + E_c + E_d} \quad (2)$$

where $K_a$ is the azimuth slope factor which is not necessarily equal to $K_e$. The $\alpha$ and $\epsilon$ positions are then fed through additional well known missile electronics to well known servo systems (not shown) that move the missile toward the center of the beam pattern. When all signals are equal in magnitude ($E_a=E_b=E_c=E_d$) the missle is on-axis and the position signals are zero.

Figure 7:
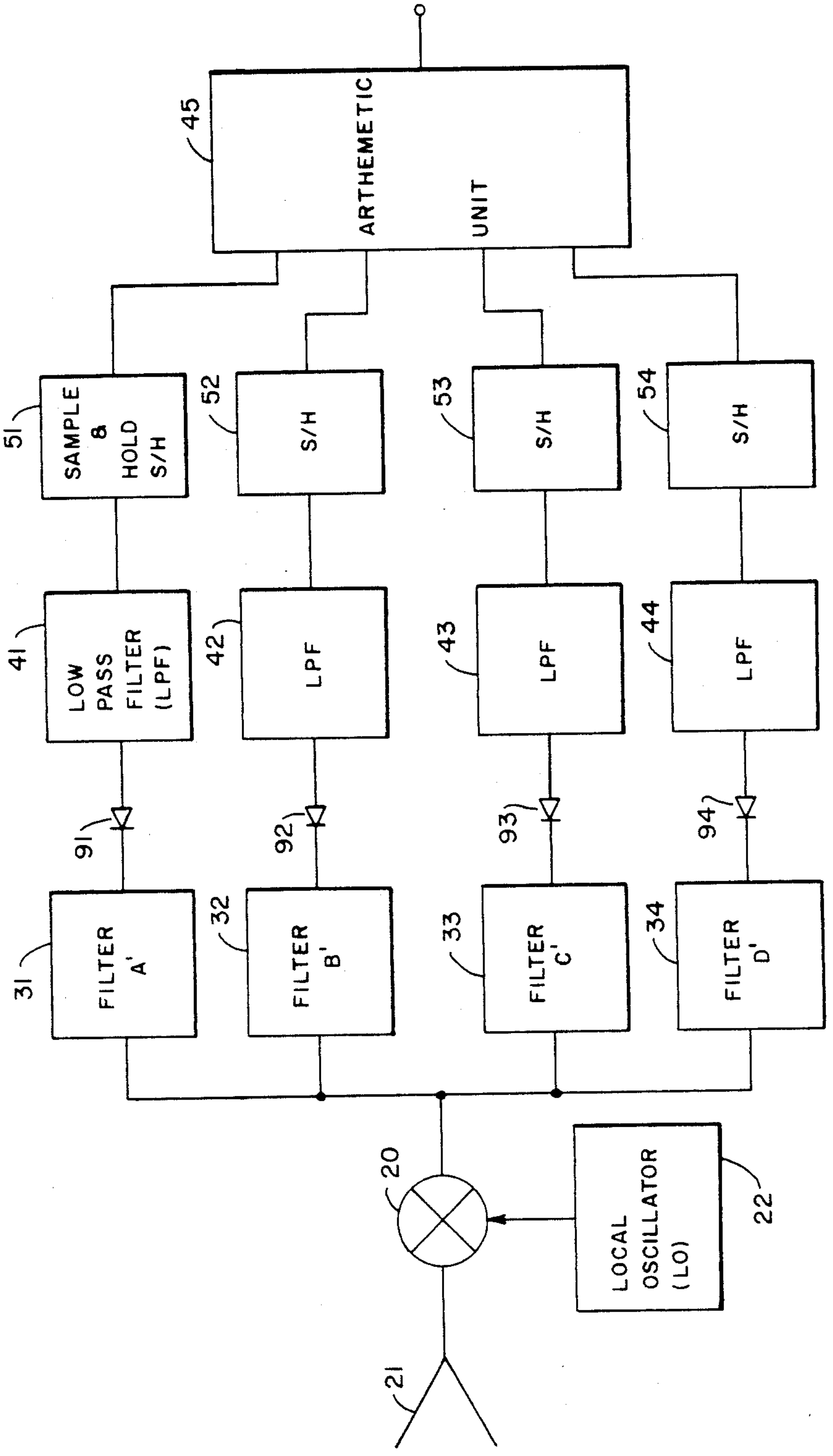
FIG. 7 is a block diagram of a system for asynchronously resolving missile position within the four illumination beams of FIG. 6.

A block diagram of one possible generalized receiver that could be used on board the missile is shown in FIG. 7. After receiving the transmitted signal from antenna 21, the mixer 20 offsets the microwave or millimeter wave signal to an intermediate frequency (IF) by mixing with a local oscillator 22. A second down conversion process might also be employed in order to reduce the frequency even further although it is not shown. Each transmitted pulse $A^1$–$D^1$ is then filtered by filters 31–34 respectively. Following the filters diodes 91–94 can be used to detect the signal. Each lowpass filter or integrator, 41–44, must have a time constant such that the detected voltages $E_a$, $E_b$, etc remain essentially constant for at least the time necessary to transmit the full four-code sequence. A sample of the signal may then be taken asynchronously at a rate governed by the fastest of either the missile response time or every full four-code sequence. Upon completion of the sampling process by sample and hold devices 51–54, a digital number or a voltage value proportional to $E_a$, $E_b$, $E_c$, and $E_d$ would be sent to the arithmetic unit 45. This unit would be either a digital or analog electrical circuit which would calculate the values of and according to the relationships given in Equations [1] and [2]. Such an asynchronous scheme would be operational; however, synchronous operation would most likely be preferred because of improved performance. In this case a synchronizing signal would have to be sent along with one of the four codes, or as a separate signal. In this case four separate codes could be sent as in asynchronous operation or just four properly timed pulses could be sent. If timed pulses were used the missile would have to have knowledge on-board as to the timing sequence. In this implementation, the quantity of on-board electronics is reduced although the components would be more complex than in asynchronous operation.

Figure 8:
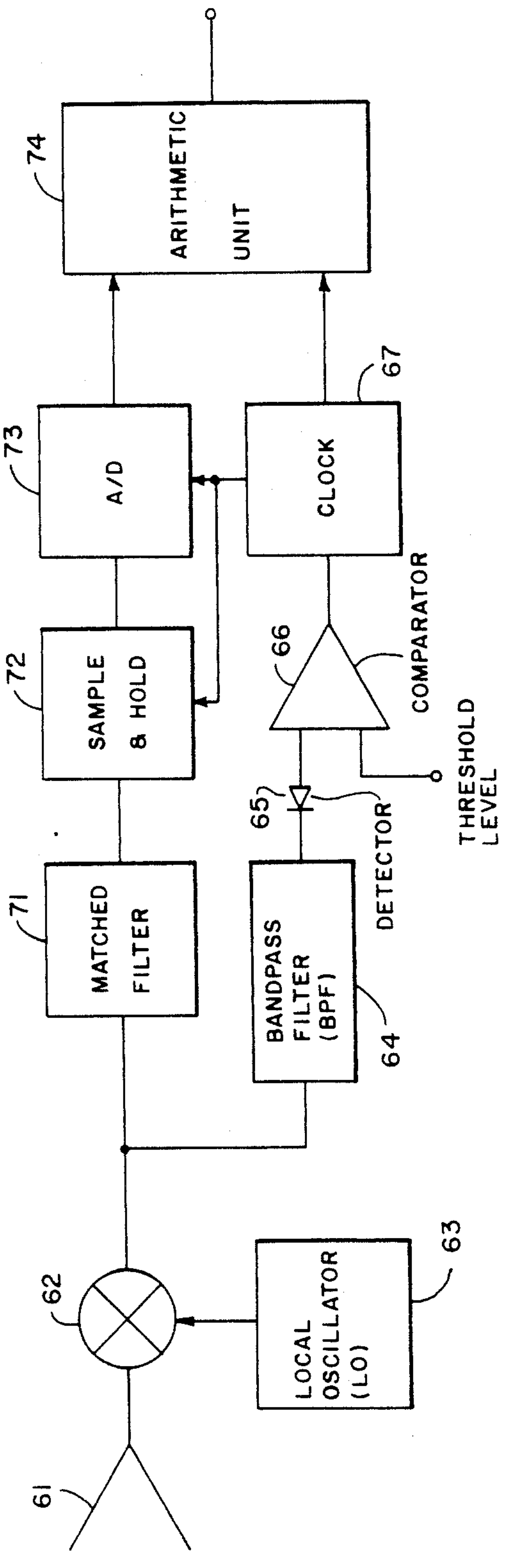
FIG. 8 is a block diagram of the circuitry necessary to synchromously resolve missile position within the four illumination beams of FIG. 6.

A generalized block diagram of a receiver implementation is depicted in FIG. 8. In this receiver a fifth synchronizing pulse is assumed to be transmitted from a known horn on the radar. As in the earlier example the signal is first received by the antenna 61 and down converted through the mixer 62 and local oscillator 63 action. The design of the receiver is such that the synchronizing signal passes through the bandpass filter 64 while the actual guidance pulses pass through the low pass matched filter 71. A synchronizing pulse would be detected in diode 65. If the detected signal is greater than a prescribed threshold level, the output of the comparator 66 will start the clock 67 and pulses at a rate proportional to the radar transmission guidance sequence would be generated.

Following reception of the synchronizing signal, four identical guidance signals would be received in a known sequence from the radar. These signals would not be allowed to pass through the bandpass filter 64 but would instead pass through filter 71 whose characteristics are matched to this signal. At the proper time the clock would send a pulse and command the sample and hold circuit 72 to sample the signal. Following the sample, an analog to digital (A/D) converter 73 would be commanded to encode the signal amplitude into a binary word. As each of these signals are sequentially encoded, they are sent to the arithmetic unit 74. The arithmetic unit performs the same computational function as unit 45 in the asynchronous receiver; however, some integral storage is necessary in this unit to store the binary outputs until all four are received.

As described, the synchronizing signal would be provided before every guidance sequence. This is not always necessary if the timing between the radar and the clock can be made accurate enough. Ultimately, only a single sync signal would be necessary to provide clock initiation, and it could even be provided before launch. The output of the arithmetic unit either 45 or 74 goes to the servo electronics (not shown) ultimately to control the missile.

This hybrid beamrider system offers the advantage of using monopulse tracking within the radar while simultaneously providing guidance information to a missile. As a tracker, the radar operates strictly as a monopulse system. This system would slightly reduce the efficiency of the monopulse tracker because target illumination is not collinear with the receive sum beam and because of additional loss associated with the transmit feed. However, the advantages offset this loss of efficiency. The data rate for the tracking system is equal to that of an ordinary monopulse system, that is once per pulse repetition frequency. The missile data rate, on the other hand, is equal to one-fourth of the tracking rate since it takes four sequential beams to provide the necessary position information to the arithmetic unit for processing.

The loss of signal to the radar due to transmission of offset beams can be overcome by transmitting a fifth pulse through the sum beam port, Σ, of FIG. 5. If this implementation is to be exploited, the signal from transmitter 10, would have to be sent through another circulator to permit both transmission and reception through this port. In this case the radar data rate could be made independent of the guidance rate and furthermore different power levels could be used for guidance and tracking. A further use of this beam would be as the synchronizing signal for the missile guidance.

I claim:

1. A beamrider guidance system for guiding a guided device toward a target; said system having multiple transmitting and receiving antenna means which are spatially offset from each other; the improvement comprising a method having the steps of transmitting a plurality of different coded radar signals sequentially by said antenna means towards said target and said guided device; selecting the number of coded radar signals to be equal to the number of antenna means such that each antenna means will always transmit the same coded radar signal; receiving and processing said signals by the guided device so as to provide guidance about a center position of all of the coded radar signals; utilizing reflected signals off said target from each of the coded radar signals to position said antenna means toward said target; utilizing a four-horn antenna feed for the multiple antenna means; and supplying the different coded radar signal to the horn feeds for transmission.

* * * * *